United States Patent
Vagarali et al.

(12) 
(10) Patent No.: US 6,780,394 B2
(45) Date of Patent: Aug. 24, 2004

(54) HIGH PRESSURE PRODUCTION OF PEROVSKITES AND RESULTING PRODUCTS

(75) Inventors: Suresh S. Vagarali, Columbus, OH (US); John W. Lucek, Powell, OH (US)

(73) Assignee: Diamond Innovations, Inc., Worthington, OH (US)

( * ) Notice: Subject to any disclaimer, the term of this patent is extended or adjusted under 35 U.S.C. 154(b) by 218 days.

(21) Appl. No.: 09/931,312

(22) Filed: Aug. 16, 2001

(65) Prior Publication Data

US 2003/0034591 A1 Feb. 20, 2003

(51) Int. Cl.$^7$ .......................... C01F 11/00; C01F 17/00; C01G 55/00; C01G 21/00; C01D 1/00

(52) U.S. Cl. .................. 423/593.1; 423/594.1; 423/594.2; 423/594.3; 423/594.4; 423/594.5; 423/594.6; 423/595; 423/596; 423/598; 423/599; 423/600; 423/594.7; 423/594.8; 423/594.9; 423/594.12; 423/594.13; 423/594.15; 423/594.16; 423/252; 423/263

(58) Field of Search .............. 423/263, 594.16, 423/593.1, 594.1, 594.2, 594.3, 594.4, 594.5, 594.6, 595, 596, 598, 599, 600, 594.7, 594.8, 594.9, 594.12, 594.13, 594.15, 252

(56) References Cited

U.S. PATENT DOCUMENTS 5,900,223 A * 5/1999 Matijevic et al.

FOREIGN PATENT DOCUMENTS

JP 48-5692 * 1/1973

OTHER PUBLICATIONS

DeVries, et al., High–pressure synthesis of lead chromate (IV), J. of the American Ceramic Society, 1968, no month, 51(2), pp. 72–75.*

* cited by examiner

Primary Examiner—Steven Bos
(74) Attorney, Agent, or Firm—Pepper Hamilton LLP

(57) ABSTRACT

A perovskite feedstock (powder or preform) is placed in a high-pressure cell of a high pressure/high temperature (HP/HT) apparatus and subjected to pressures in excess of about 2 kbar and temperatures above about 800° C. for a time adequate to increase the density of the preform.

17 Claims, No Drawings

HIGH PRESSURE PRODUCTION OF PEROVSKITES AND RESULTING PRODUCTS

CROSS-REFERENCE TO RELATED APPLICATIONS

None

STATEMENT REGARDING FEDERALLY SPONSORED RESEARCH

Not applicable.

BACKGROUND OF THE INVENTION

The present invention relates generally to the production of perovskite products, such as typified by ruthenium-based oxide compounds, and more particularly to their densification and sintering under high-pressure conditions.

Simple ruthenium based oxides, for example, $ARuO_3$, where A is Sr, Ba, or Ca, have interesting magnetic and electrical properties. These oxides also have the potential for device applications. $SrRuO_3$, for example, is a ferromagnet with Tc~160 K, whereas $CaRuO_3$ exhibits no ferromagnetic order. These ruthenium-based oxides also are electrically conductive.

$SrRuO_3$, for example, has commercial application as a high density sputtering target for a variety of emerging electronic applications including, for example, production of thin films as electrodes in the next generation of high capacity stack storage capacitors and production of dynamic random access memory (DRAM) and ferroelectric random access memory (FeRAM) for the semiconductor industry. The theoretical density of $SrRuO_3$ is 6.489 g/cc. SrRuO3 targets with high density (>90% of theoretical density) are essential for production of thin films with uniform thickness by sputtering. $SrRuO_3$, however, is difficult to densify by conventional methods, such as cold pressing and sintering, or hot pressing. Sintering temperatures also are limited to less than 1400° C. due to dissociation of the compound at low pressures and contamination because of reaction with containment material. $SrRuO_3$ compacts made by conventional densification methods are reported to have densities of less than 50% of the theoretical density.

Thus, there exists a need in the art to provide dense compacts of cubic perovskite products, as typified by ruthenium-based oxides.

BRIEF SUMMARY OF THE INVENTION

A perovskite feedstock (e.g., a perform or powder) is placed in a high=pressure cell of a high pressure/high temperature (HP/HT) apparatus and subjected to pressures in excess of about 2 kbar and temperatures above about 800° C. for a time adequate to increase the density of the perform. The perform may be made, interalia, by cold pressing, cold pressing and sintering, or hot pressing.

High pressure and high temperature processing of cubic perovskite preforms has an advantage in sintering of the preforms to higher densities. Another advantage is that high pressure may accomplish the sintering at lower temperatures, thus preserving stoichiometric and purity. A further advantage is that sintering at higher temperatures can be done without dissociation of the compound. Further sintering at high pressures will minimize grain growth so that fine-grained dense compacts can be produced. Fine grain size and high density are very important for targets used in production of thin films with uniform thickness. These and other advantages will be readily apparent to those skilled in the art based upon the present disclosure.

DETAILED DESCRIPTION OF THE INVENTION $SrRuO_3$ belongs to class of materials called cubic perovskites. The principle perovskite structure found in ferroelectric materials is a simple cubic structure containing three different ions of the form $ABO_3$. The A and B atoms represent +2 and +4 ions, respectively, while the O atom is the $O^{-2}$ ion. This $ABO_3$ structure, in a general sense, can be thought of as face centered cubic (FCC) lattice with A atoms at the corners and the O atoms on the faces. The B atom completes the picture and is located at the center of the lattice. This A atom is the largest of the atoms and consequently increases the overall size of the $AO_3$ (FCC) structure. As a result, there are minimum energy positions off centered from the original octahedron that can be occupied by the B atom.

Different types of A and B elements include:

Dodecahedral A-site: $Na^+$, $K^+$, $Rb^+$, $Ag^+$, $Ca^{+2}$, $Sr^{+2}$, $Ba^{+2}$, $Pb^{+2}$, $La^{+3}$, $Pr^{+3}$, $Nb^{+3}$, $Bi^{+3}$, $Y^{+3}$, $Ce^{+4}$, $Th^{+4}$.

Octahedral B-site: $Li^+$, $Cu^{+2}$, $Mg^{+2}$, $Ti^{+3}$, $V^{+3}$, $Cr^{+3}$, $Mn^{+3}$, $Fe^{+3}$, $Co^{+3}$, $Al^{+3}$, $Ni^{+3}$, $Rh^{+3}$, $Hf^{+4}$, $Ti^{+4}$, $Zr^{+4}$, $Mn^{+4}$, $Ru^{+4}$, $Pt^{+4}$, $Nb^{+5}$, $Ta^{+5}$, $Mo^{+6}$, $W^{+6}$.

The atomic structure of ferroelectric thin films is very sensitive to fluctuations in the temperature of the crystal. As the temperature is changed, the crystallographic dimensions change due to distortion of the octrahedra. These different crystal structures are: cubic, tetragonal, orthorhombic, and rhombohedral. As a result, the distorted octrahedra are coupled together, and a very large spontaneous polarization can be achieved. This large spontaneous polarization will lead to a large dielectric constant, with sensitive temperature dependence.

Reported applications of perovskites include: $BaTiO_3$, multilayer capacitor; $Pb(Zr, Yi)O_3$, piezoelectric transducer; $BaTiO_3$; electro-optic modulator, $(Pb, La)(Zr, Ti)O_3$; $LiNbO_3$, switch; $BaZrO_3$, dielectric resonator; $BaRuO_3$, thick film resistor; $Pb(Mg, Nb)O_3$, electrostrictive actuator; $Ba(Pb, Bi)O_3$ layered cuprates, superconductor; $GdFeO_3$, magnetic bubble memory; $YAlO_3$, laser host; $(Ca, La)MnO_3$, refractory electrode; and $KNbO_3$, second harmonic generator. While most perovskites have high electrical resistivities that make them good as dielectrics, some are considered to be good conductors and semi-conductors. Some of the best perovskite conductors are the cubic sodium tungsten bronzes ($Na_xWO_3$; where x is between 0.3 and 0.95). In these bronzes, the resistivity tends to minimize at 0.7 mole-% of Na.

The perovskite material subjected to the HP densification process, or feedstock, can be in powder form or can be converted into a preform for ease in handling. A "preform" is a coherent mass of material in a pre-determined shape. The preform most often is made by pressing of the feed material, optionally, with heat added during the pressing or afterwards (sintering). Regardless of the technique of choice in forming the preform, such preform (or the powder itself) next is placed within a shield or enclosure material (Ta, Grafoil) and the wrapped preform placed within the reaction cell of the HP/HT apparatus.

The basic high pressure/high temperature (HP/HT) manufacturing method of the type herein involved entails the placing of a mass of feed cubic perovskite within a protectively shielded enclosure which is disposed within the reaction cell of an HP/HT apparatus of a type described in U.S. Pat. Nos. 2,947,611; 2,941,241; 2,941,248; 3,609,818; 3,767,371; 4,289,503; 4,673,414; and 4,954,139. The contents of the cell then are subject to processing conditions selected as sufficient to affect a sintering and densification of the cubic perovskite. Such processing conditions generally involve the imposition of a pressure above about 2 kbar and temperatures above about 800° C. for at least about 3 minutes. Useful pressure can be expected to range from about 2 to about 75 kbar with corresponding useful temperatures from between about 800° to about 1600° C. Pressing times should ranges from about 3 minutes to about 24 hours.

Following such high-pressure excursion, the temperature initially is lowered followed by release of the pressure. The shield material then can be ground off or dissolved in a solvent therefor and the densified cubic perovskite recovered. The densified cubic perovskite then can be machined or otherwise processed according to its intended use.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLES

Example 1

Sample #1 was in the form a cylindrical disc of $SrRuO_3$, which had a density of 3.16 gm/cc and the following dimensions: diameter=0.518 inch and thickness=0.085 inch. The sample was encased in 0.004-inch thick molybdenum foil to prevent reaction with surrounding high-pressure medium. Further, 0.015 inch thick Grafoil parting layer was placed around the molybdenum foil. The encased disc was placed in the high pressure cell containing graphite as pressure transmitting medium and pressed at ~60 kb and 120° C. for 25 minutes. The dimensions of the sample after pressing were: diameter=0.505 inch, thickness=0.050 inch, and the weight was 0.880 gm. This sample has a density of 5.36 gm/cc (theoretical density of 6.489 g/cc). Hence, the density of the sample was increased from 3.16 g/cc to 5.36 g/cc (82.6% of theoretical density) by high pressure and high temperature processing.

Example 2

Sample #6 was in the form of a cylinder disc of SrRuO3. The disc was friable and no density on it could be determined. The disc was encase in 0.004" thick molybdenum foil and place in a high-pressure cell containing salt (sodium chloride) as the pressure-transmitting medium. The sample was subject to 60 kbar pressure and 1200° C. for 35 minutes.

The sample was recovered from the reaction cell and the molybdenum encasement was removed by grinding. The density of the product, as measured by immersion technique, was 6.36 gm/cc. X-ray diffraction analysis of the sample confirmed that it is $SrRuO_3$. The theoretical density of SrRuO3 is 6.489 gm/cc. Hence, the sample of SrRuO3 prepared by high pressure and high temperature processing was 98% of the theoretical density. The product also was phase pure.

What is claimed is:

1. Method for increasing the density of a perovskite, which comprises the steps of:
    (a) placing a perovskite feedstock in a high-pressure cell of a high pressure/high temperature (HP/HT) apparatus;
    (b) subjecting said feedstock to pressures in excess of about 2 kbar and temperatures above about 800° C. for time in excess of 3 minutes to produce a cubic perovskite product having a density which is greater than said feedstock; and
    (c) recovering said perovskite product.

2. The method of claim 1, wherein said perovskite is represented by the structure, $ABO_3$, where:
    A is one or more of $Na^+$, $K^+$, $Rb^+$, $Ag^+$, $Ca^{+2}$, $Sr^{+2}$, $Ba^{+2}$, $Pb^{+2}$, $La^{+3}$, $Pr^{+3}$, $Nb^{+3}$, $Bi^{+3}$, $Y^{+3}$, $Hf^{+4}$, or $Th^{+4}$; and
    B is one or more of $Li^+$, $Cu^{+2}$, $Mg^{+2}$, $Ti^{+3}$, $V^{+3}$, $Cr^{+3}$, $Mn^{+3}$, $Fe^{+3}$, $Co^{+3}$, $Al^{+3}$, $Ni^{+3}$, $Rh^{+3}$, $Hf^{+4}$, $Ti^{+4}$, $Zr^{+4}$, $Mn^{+4}$, $Ru^{+4}$, $Pt^{+4}$, $Nb^{+5}$, $Ta^{+5}$, $Mo^{+6}$ or $W^{+6}$.

3. The method of claim 2, wherein said feedstock is $SrRuO_3$.

4. The method of claim 1, wherein said perovskite feedstock is one or more of powder or a perform.

5. The method of claim 1, wherein said perovskite product has a density of greater than about 60% of its theoretical density.

6. The method of claim 5, wherein said perovskite product has a density of greater than about 90% of its theoretical density.

7. The method of claim 1, wherein step (b) is conducted for a time ranging from between about 3 minutes and 24 hours.

8. The method of claim 1, wherein said pressure ranges from about 2 to 75 kbar and said temperature ranges from about 800° to 1600° C.

9. The method of claim 7, wherein said pressure ranges from about 2 to 75 kbar and said temperature ranges from about 800° to 1600° C.

10. Method for increasing the density of a perovskite, which comprises the steps of:
    (a) placing a perovskite feedstock in a high-pressure cell of a high pressure/high temperature (HP/HT) apparatus;
    (b) subjecting said feedstock to pressures in excess of about 2 kbar and temperatures above about 800° C. for time adequate to increase the density of said feedstock to above about 60% of its theoretical density; and
    (c) recovering said perovskite product having a density above about 60% of its theoretical density.

11. The method of claim 10, wherein said perovskite is represented by the structure, $ABO_3$, where:
    A is one or more of $Na^+$, $K^+$, $Rb^+$, $Ag^+$, $Ca^{+2}$, $Sr^{+2}$, $Ba^{+2}$, $Pb^{+2}$, $La^{+3}$, $Pr^{+3}$, $Nb^{+3}$, $Bi^{+3}$, $Y^{+3}$, $Hf^{+4}$, or $Th^{+4}$; and
    B is one or more of $Li^+$, $Cu^{+2}$, $Mg^{+2}$, $Ti^{+3}$, $V^{+3}$, $Cr^{+3}$, $Mn^{+3}$, $Fe^{+3}$, $Co^{+3}$, $Al^{+3}$, $Ni^{+3}$, $Rh^{+3}$, $Hf^{+4}$, $Ti^{+4}$, $Zr^{+4}$, $Mn^{+4}$, $Ru^{+4}$, $Pt^{+4}$, $Nb^{+5}$, $Ta^{+5}$, $Mo^{+5}$ or $W^{+6}$.

12. The method of claim 10, wherein said feedstock is $SrRuO_3$.

13. The method of claim 10, wherein said perovskite feedstock is one or more of powder or a perform.

14. The method of claim 10, wherein said perovskite product has a density of greater than about 90% of its theoretical density.

15. The method of claim 10, wherein step (b) is conducted for a time ranging from between about 3 minutes and 24 hours.

16. The method of claim 10, wherein said pressure ranges from about 2 to 75 kbar and said temperature ranges from about 800° to 1600° C.

17. The method of claim 16, wherein said pressure ranges from about 2 to 75 kbar and said temperature ranges from about 800° to 1600° C.

* * * * *